(12) United States Patent
Wang

(10) Patent No.: US 12,370,666 B2
(45) Date of Patent: Jul. 29, 2025

(54) COUNTERBALANCING MECHANISM AND POWER TOOL HAVING SAME

(71) Applicant: Black & Decker Inc., New Britain, CT (US)

(72) Inventor: Yanchao Wang, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/485,888

(22) Filed: Oct. 12, 2023

(65) Prior Publication Data

US 2024/0033892 A1 Feb. 1, 2024

Related U.S. Application Data

(63) Continuation of application No. 17/654,133, filed on Mar. 9, 2022, now Pat. No. 11,839,964.

(51) Int. Cl.
*B23D 51/16* (2006.01)
*B25F 5/00* (2006.01)
*B23D 49/16* (2006.01)

(52) U.S. Cl.
CPC ............ *B25F 5/006* (2013.01); *B23D 49/162* (2013.01); *B23D 49/165* (2013.01); *B23D 51/16* (2013.01)

(58) Field of Classification Search
CPC .... B23D 49/16; B23D 49/162; B23D 49/165; B23D 51/10; B23D 51/16; B23D 59/006; B27F 5/001; B27F 5/006
USPC .... 173/49, 178, 217, 114, 109; 30/392, 393, 30/394
See application file for complete search history.

(56) References Cited

U.S. PATENT DOCUMENTS

| | | | |
|---|---|---|---|
| 1,362,628 | A | 12/1920 | Lewis |
| 1,525,070 | A | 2/1925 | Coleman |
| 2,240,755 | A | 5/1941 | Martin |
| 2,610,524 | A | 9/1952 | Maust |
| 2,704,941 | A | 3/1955 | Holford |

(Continued)

FOREIGN PATENT DOCUMENTS

| | | |
|---|---|---|
| CN | 2853254 Y | 1/2007 |
| CN | 104209586 A | 12/2014 |

(Continued)

OTHER PUBLICATIONS

International Search Report and Written Opinion, PCT Application No. PCT/US2023/064005, Aug. 25, 2023, 10 pages, USPTO.

*Primary Examiner* — Scott A Smith
(74) *Attorney, Agent, or Firm* — Brake Hughes Bellermann LLP

(57) ABSTRACT

A reciprocating power tool may include a driving system including a motor and a transmission received in a housing to drive a reciprocating mechanism. A counterbalance mechanism may be coupled between the driving system and the reciprocating mechanism. The counterbalance mechanism may include a rotating counterbalance mechanism including a first rotating counterweight member and a second rotating counterweight member coupled to an output gear of the driving system. The counterbalance mechanism may include a rocking counterweight member coupled between the output gear and the housing. The output gear may include a recessed portion in which the first rotating counterweight member and a clutching system are received.

9 Claims, 15 Drawing Sheets

(56) References Cited

U.S. PATENT DOCUMENTS

| | | | |
|---|---|---|---|
| 2,931,402 A | 4/1960 | Papworth |
| 2,949,944 A | 8/1960 | Blachly |
| 2,966,178 A | 12/1960 | Katzfey |
| 2,970,484 A | 2/1961 | Springer |
| 3,095,748 A | 7/1963 | Stelljes et al. |
| 3,205,721 A | 9/1965 | Speer |
| 3,206,989 A | 9/1965 | Enders |
| 3,229,793 A | 1/1966 | Jacobson |
| 3,246,528 A | 4/1966 | Kosch |
| 3,270,369 A | 9/1966 | William |
| 3,309,932 A | 3/1967 | Davis |
| 3,451,276 A | 6/1969 | Wadlow et al. |
| 3,457,796 A | 7/1969 | Leach et al. |
| 3,461,732 A | 8/1969 | Gregory |
| 3,482,458 A | 12/1969 | Bednarski |
| 3,655,021 A | 4/1972 | Froio |
| 3,688,522 A | 9/1972 | Schmuck |
| 3,729,823 A | 5/1973 | Bos et al. |
| 3,750,483 A | 8/1973 | Burrows et al. |
| 3,766,362 A | 10/1973 | Pell et al. |
| 3,978,862 A | 9/1976 | Morrison |
| 4,145,811 A | 3/1979 | Kendzior |
| 4,385,443 A | 5/1983 | Obanion |
| 4,482,042 A | 11/1984 | Siska et al. |
| 4,542,812 A | 9/1985 | Westley |
| 4,884,344 A | 12/1989 | Martinez et al. |
| 5,009,012 A | 4/1991 | Martinez et al. |
| 5,025,562 A | 6/1991 | Palm |
| 5,050,307 A | 9/1991 | Palm |
| 5,099,705 A | 3/1992 | Dravnieks |
| 5,134,777 A | 8/1992 | Meyer et al. |
| 5,212,887 A | 5/1993 | Farmerie |
| 5,392,519 A | 2/1995 | Inoue et al. |
| 5,450,925 A | 9/1995 | Smith et al. |
| RE35,258 E | 6/1996 | Palm |
| 5,561,909 A | 10/1996 | Berg et al. |
| 5,566,458 A | 10/1996 | Palm |
| 5,598,636 A | 2/1997 | Stolzer |
| 5,607,023 A | 3/1997 | Palm |
| 5,653,030 A | 8/1997 | Yokoyama et al. |
| 5,689,891 A | 11/1997 | Bednar et al. |
| 5,782,000 A | 7/1998 | Bednar |
| 5,806,191 A | 9/1998 | Yokoyama et al. |
| 5,964,039 A | 10/1999 | Mizoguchi et al. |
| 6,012,346 A | 1/2000 | Vo |
| 6,209,208 B1 | 4/2001 | Marinkovich et al. |
| 6,212,781 B1 | 4/2001 | Marinkovich et al. |
| RE37,211 E | 6/2001 | Bednar et al. |
| 6,249,979 B1 | 6/2001 | Bednar et al. |
| 6,260,281 B1 | 7/2001 | Okumura et al. |
| 6,282,797 B1 | 9/2001 | Osada et al. |
| 6,286,217 B1 | 9/2001 | Dassoulas et al. |
| 6,295,910 B1 | 10/2001 | Childs et al. |
| RE37,529 E | 1/2002 | Bednar et al. |
| 6,357,125 B1 | 3/2002 | Feldmann et al. |
| D455,328 S | 4/2002 | Bruno |
| 6,370,781 B1 | 4/2002 | Sasaki |
| 6,508,151 B1 | 1/2003 | Neitzell |
| 6,634,107 B2 | 10/2003 | Osada |
| 6,634,437 B1 | 10/2003 | Rudolph |
| 6,662,455 B2 | 12/2003 | Tachibana et al. |
| 6,688,005 B1 | 2/2004 | Tachibana et al. |
| 6,742,267 B2 | 6/2004 | Marinkovich et al. |
| 6,758,119 B1 | 7/2004 | Neitzell |
| RE38,606 E | 10/2004 | Bednar et al. |
| 6,829,831 B1 | 12/2004 | Neitzell |
| 6,851,193 B2 | 2/2005 | Bednar et al. |
| 6,860,886 B1 | 3/2005 | Lee |
| 6,877,235 B2 | 4/2005 | Osada |
| 6,976,313 B2 | 12/2005 | Wong |
| 7,117,601 B2 | 10/2006 | Hai-Chun |
| 7,127,973 B2 | 10/2006 | Neitzell et al. |
| 7,188,425 B2 | 3/2007 | Bednar et al. |
| 7,191,847 B2 | 3/2007 | Haas |
| 7,216,433 B2 | 5/2007 | Haas et al. |
| 7,225,546 B2 | 6/2007 | Hartmann |
| 7,290,343 B2 | 11/2007 | Hartmann |
| 7,363,713 B2 | 4/2008 | Kobayashi et al. |
| 7,448,137 B2 | 11/2008 | Neitzell et al. |
| 7,506,447 B2 | 3/2009 | Wheeler et al. |
| 7,637,018 B2 | 12/2009 | Zhang |
| 7,658,012 B2 | 2/2010 | James et al. |
| 7,707,729 B2 | 5/2010 | Moreno |
| 7,793,420 B2 | 9/2010 | Griep et al. |
| 7,818,887 B2 | 10/2010 | Saegesser et al. |
| 7,886,841 B2 | 2/2011 | Armstrong |
| 7,996,996 B2 | 8/2011 | Hirabayashi |
| 8,230,608 B2 | 7/2012 | Oberheim |
| 8,307,910 B2 | 11/2012 | Holmes et al. |
| D674,263 S | 1/2013 | Aglassinger |
| 8,371,032 B2 | 2/2013 | Hirabayashi |
| 8,403,075 B2 | 3/2013 | Schlesak et al. |
| 8,407,901 B2 | 4/2013 | Oberheim |
| 8,407,902 B2 | 4/2013 | Naughton et al. |
| 8,549,762 B2 | 10/2013 | Oberheim |
| 8,763,722 B2 | 7/2014 | Braun et al. |
| 8,813,373 B2 | 8/2014 | Scott |
| 8,881,409 B2 | 11/2014 | Haman |
| 8,905,153 B2 | 12/2014 | Braun et al. |
| 9,061,411 B2 | 6/2015 | Naughton et al. |
| 9,132,491 B2 | 9/2015 | Alberti et al. |
| 9,156,097 B2 | 10/2015 | Neitzell et al. |
| 9,233,427 B2 | 1/2016 | Alberti et al. |
| 9,272,347 B2 | 3/2016 | Holmes et al. |
| 9,375,795 B2 | 6/2016 | Oberheim |
| 9,393,681 B2 | 7/2016 | Werner |
| 9,470,273 B2 | 10/2016 | Lang et al. |
| 9,561,552 B2 | 2/2017 | Kocsis et al. |
| 9,573,207 B2 | 2/2017 | Sugita et al. |
| 9,579,735 B2 | 2/2017 | Wattenbach et al. |
| 9,700,949 B2 | 7/2017 | Wang |
| 9,724,771 B2 | 8/2017 | Aoki et al. |
| 9,776,263 B2 | 10/2017 | Adams et al. |
| 9,833,850 B2 | 12/2017 | Schmid |
| 9,956,625 B2 | 5/2018 | Adams et al. |
| 9,962,779 B2 | 5/2018 | Haas |
| 10,144,106 B2 | 12/2018 | McLain et al. |
| 10,259,060 B2 | 4/2019 | Sugino et al. |
| 10,300,541 B2 | 5/2019 | Adams et al. |
| 10,464,148 B2 | 11/2019 | Wattenbach et al. |
| 10,960,474 B2 | 3/2021 | Wang |
| 11,229,963 B2 | 1/2022 | Mougeotte et al. |
| 11,453,093 B2 | 9/2022 | Baskar et al. |
| 11,554,430 B2 | 1/2023 | Ukai et al. |
| 11,628,508 B2 | 4/2023 | Liu et al. |
| 11,839,964 B2 * | 12/2023 | Wang ............ B25F 5/006 |
| 2003/0009888 A1 | 1/2003 | Marinkovich et al. |
| 2003/0121389 A1 | 7/2003 | Wheeler et al. |
| 2004/0187324 A1 | 9/2004 | James et al. |
| 2004/0194987 A1 | 10/2004 | Hanke et al. |
| 2004/0231170 A1 | 11/2004 | Neitzell et al. |
| 2004/0261273 A1 | 12/2004 | Griep et al. |
| 2005/0016001 A1 | 1/2005 | Griep et al. |
| 2005/0252670 A1 | 11/2005 | Prell et al. |
| 2005/0262708 A1 | 12/2005 | Haas et al. |
| 2006/0124331 A1 | 6/2006 | Stirm et al. |
| 2007/0017684 A1 | 1/2007 | Stirm et al. |
| 2007/0074407 A1 | 4/2007 | Serdynski et al. |
| 2007/0135803 A1 | 6/2007 | Belson |
| 2008/0251568 A1 | 10/2008 | Zemlok et al. |
| 2008/0287944 A1 | 11/2008 | Pearson et al. |
| 2008/0289843 A1 | 11/2008 | Townsan |
| 2008/0308602 A1 | 12/2008 | Timm et al. |
| 2008/0308606 A1 | 12/2008 | Timm et al. |
| 2008/0308607 A1 | 12/2008 | Timm et al. |
| 2010/0162579 A1 | 7/2010 | Naughton et al. |
| 2010/0320252 A1 | 12/2010 | Mola et al. |
| 2011/0107608 A1 | 5/2011 | Wattenbach et al. |
| 2011/0139475 A1 | 6/2011 | Braun et al. |
| 2011/0315413 A1 | 12/2011 | Fisher et al. |
| 2012/0096721 A1 | 4/2012 | Sinur |
| 2012/0192440 A1 | 8/2012 | Jerabek et al. |
| 2012/0261153 A1 | 10/2012 | Aoki |
| 2013/0019483 A1 | 1/2013 | Naughton et al. |

(56) References Cited

U.S. PATENT DOCUMENTS

| | | |
|---|---|---|
| 2013/0055576 A1 | 3/2013 | Holmes et al. |
| 2013/0062090 A1 | 3/2013 | Winnard |
| 2013/0199812 A1 | 8/2013 | Dangelmaier et al. |
| 2013/0247391 A1 | 9/2013 | Armstrong |
| 2014/0171966 A1 | 6/2014 | Giordano et al. |
| 2014/0245620 A1 | 9/2014 | Fankhauser et al. |
| 2014/0299345 A1 | 10/2014 | McRoberts et al. |
| 2015/0136433 A1 | 5/2015 | Nitsche et al. |
| 2015/0296719 A1 | 10/2015 | Kuehne et al. |
| 2016/0199924 A1 | 7/2016 | Haas |
| 2016/0243634 A1 | 8/2016 | Komazaki |
| 2017/0129026 A1 | 5/2017 | Wattenbach et al. |
| 2018/0370012 A1 | 12/2018 | Zheng |
| 2019/0061081 A1 | 2/2019 | Schaer |
| 2019/0275597 A1 | 9/2019 | Adams et al. |
| 2020/0009668 A1 | 1/2020 | Adams et al. |
| 2020/0030897 A1 | 1/2020 | Wattenbach et al. |
| 2020/0063827 A1 | 2/2020 | Courtial et al. |
| 2020/0070265 A1 | 3/2020 | Wang |
| 2020/0094432 A1 | 3/2020 | Monzen et al. |

FOREIGN PATENT DOCUMENTS

| | | |
|---|---|---|
| CN | 104416225 A | 3/2015 |
| DE | 803142 C | 3/1951 |
| DE | 1870185 U | 4/1963 |
| DE | 1673054 A1 | 8/1971 |
| DE | 3446278 A1 | 6/1986 |
| DE | 4009911 A1 | 10/1990 |
| DE | 102007017408 B3 | 8/2008 |
| DE | 102007062869 A1 | 8/2008 |
| DE | 102008042861 A1 | 4/2010 |
| DE | 102011077259 A1 | 12/2012 |
| DE | 102012210678 A1 | 1/2014 |
| DE | 102006041430 B4 | 3/2015 |
| DE | 102017115754 A1 | 1/2018 |
| EP | 0561473 B1 | 1/1998 |
| EP | 1980351 A2 | 10/2008 |
| EP | 2903770 A2 | 8/2015 |
| EP | 2481508 B1 | 6/2016 |
| EP | 3053686 A1 | 8/2016 |
| EP | 2119536 B1 | 8/2017 |
| EP | 3038779 B1 | 3/2020 |
| EP | 3038780 B1 | 4/2020 |
| EP | 3632603 A1 | 4/2020 |
| FR | 2451242 A1 | 10/1980 |
| GB | 891832 A | 3/1962 |
| GB | 2042973 A | 10/1980 |
| GB | 2234034 A | 1/1991 |
| GB | 2252072 A | 7/1992 |
| JP | 2009083332 A | 4/2009 |
| JP | 2009101432 A | 5/2009 |
| JP | 2011115912 A | 6/2011 |
| JP | 2014525354 A | 9/2014 |
| WO | 2006065728 A2 | 6/2006 |
| WO | 2015145912 A1 | 10/2015 |
| WO | 2015155912 A1 | 10/2015 |
| WO | 2019235065 A1 | 12/2019 |

\* cited by examiner

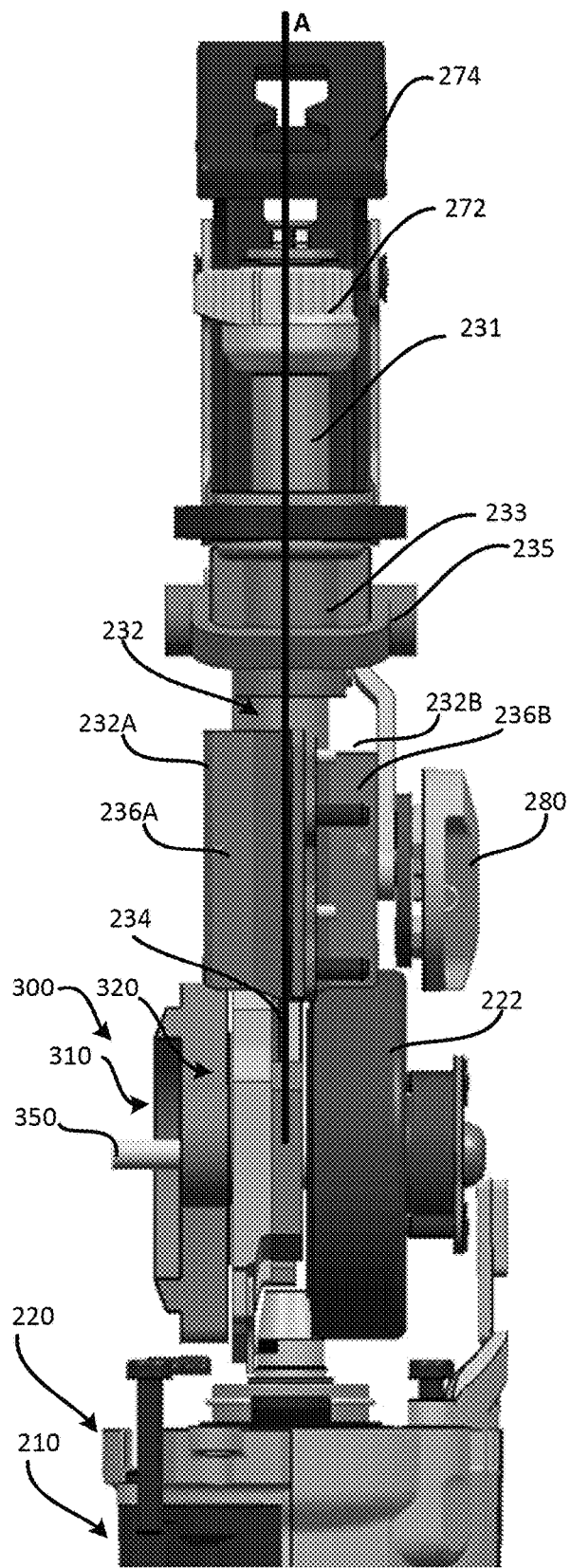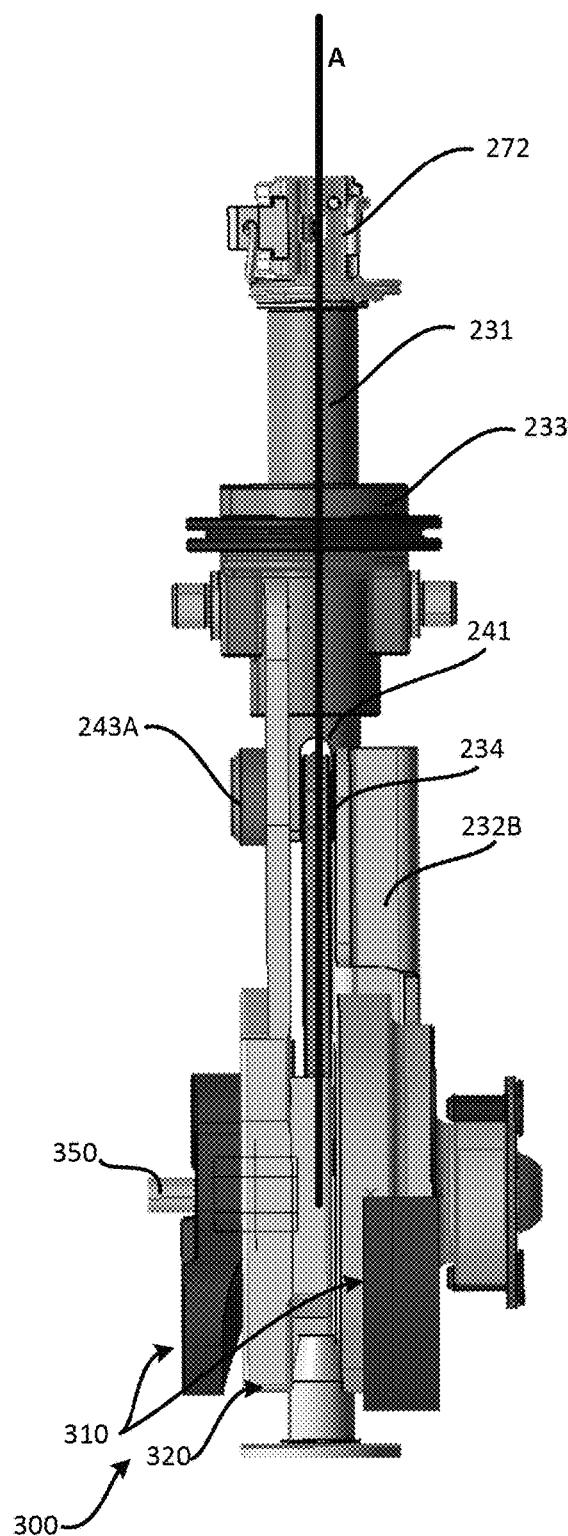
FIG. 2C(1)        FIG. 2C(2)

COUNTERBALANCING MECHANISM AND POWER TOOL HAVING SAME

CROSS-REFERENCE TO RELATED APPLICATION

This application is a continuation of, and claims priority to, U.S. application Ser. No. 17/654,133, filed on Mar. 9, 2022, now U.S. Pat. No. 11,839,964, entitled "COUNTERBALANCING MECHANISM AND POWER TOOL HAVING SAME," the disclosure of which is incorporated herein in its entirety.

FIELD

This document relates, generally, to a counterbalancing mechanism for a power-driven tool.

BACKGROUND

Reciprocating mechanisms may be included in various different types of tools such as, for example, reciprocating saws and jig saws. In these types of tools, reciprocating mechanisms may convert a rotary force or motion to a reciprocating force or motion, for output by the tool. In some examples, the reciprocating force or motion may be a substantially linear reciprocating force or motion. In some examples, the reciprocating force or motion may follow a linear path or an orbital path. Operation of a motor of this type of power tool may generate a force, for example, a rotational force. The reciprocating mechanism may be coupled to the motor by, for example, a transmission mechanism that provides for force transfer between the motor and the reciprocating mechanism. The reciprocating mechanism may convert the rotational force, or rotational motion, output by the motor to a reciprocating force or reciprocating motion, to drive a reciprocal motion of an output spindle of the tool. In some situations, forces such as vibration generated due to operation of the components of the tool, and in particular the reciprocating mechanism, may adversely affect operation of the tool. Providing for balance in the reciprocating mechanism may improve user control of the tool and may enhance utility and operational safety, enabling a user to operate the tool for extended periods of time, versus a limited duration, for a tool having relatively high vibration during operation.

SUMMARY

In one general aspect, a reciprocating power tool may include a housing; a driving mechanism including a motor and a transmission mechanism received in the housing; a reciprocating mechanism received in the housing, the reciprocating mechanism including a shaft that is coupled to an output gear of the driving mechanism, wherein the shaft is configured to reciprocate generally along an axis of operation in response to rotation of the output gear; and a counterbalance mechanism. The counterbalance mechanism may include a first counterbalance device coaxially arranged with respect to the output gear about a central axis of rotation and configured to rotate together with the output gear about the central axis of rotation; and a second counterbalance device eccentrically coupled to the output gear and configured to perform a rocking motion with respect to the central axis of rotation in response to rotation of the output gear.

In some implementations, the first counterbalance device is configured to balance forces generated by reciprocating motion of the shaft along the axis of operation when a position of the first counterbalance device is in phase with a reciprocating motion of the shaft along the axis of operation; and the second counterbalance device is configured to balance forces generated by the first counterbalance device when the position of the first counterbalance device is out of phase with reciprocating motion of the shaft along the axis of operation.

In some implementations, the first counterbalance device may include a first rotating counterweight member positioned at a first side of the axis of operation and configured to rotate about the central axis of rotation together with the output gear; and a second rotating counterweight member positioned at a second side of the axis of operation and configured to rotate about the central axis of rotation together with the output gear and the first rotating counterweight member. A center of mass of the first counterbalance device may be balanced with respect to the axis of operation. The second counterbalance device may include a rocking counterweight member, including a weighted end portion positioned between the first rotating counterweight member and the second rotating counterweight member; a slot formed in the weighted end portion, wherein the slot is eccentrically coupled to a hub portion of the output gear; and an arm portion that is pivotably coupled to a housing of the reciprocating power tool.

In some implementations, the reciprocating power tool may include a collar provided on the hub portion of the output gear, eccentrically positioned with respect to the central axis of rotation of the output gear, wherein the slot is slidably coupled on the collar such that the weighted end portion of the rocking counterweight member performs the rocking motion in response to rotation of the output gear. In some implementations, the reciprocating power tool may include a yoke having a first end portion thereof coupled to the shaft, and a second end portion thereof coupled to an eccentric pin provided on the hub portion of the output gear, coaxially arranged with the collar, such that the yoke is aligned with the axis of operation of the shaft and the second end portion of the yoke is positioned between the first counterbalance device and the second counterbalance device.

In some implementations, the first rotating counterweight member is coupled to the hub portion of the output gear, and the coupled first rotating counterweight member and hub portion are received in a recess formed in a body portion of the output gear. In some implementations, the reciprocating power tool may include a clutching system coupled in the recess formed in the output gear, between the hub portion and the body portion of the output gear. The clutching system and the first rotating counterweight member of the first counterbalance device may be fixed in the recess of the output gear and may be configured to maintain synchronized operation of the rotation of the first counterbalance device about the central axis of rotation, rocking motion of the second counterbalance device with respect to the central axis of rotation, and the reciprocating motion of the shaft along the axis of operation.

In another general aspect, a reciprocating power tool may include a housing; a driving system including a motor and a transmission received in the housing; a reciprocating mechanism received in the housing, the reciprocating mechanism including a shaft that is coupled to an output gear of the driving system, wherein the shaft is configured to reciprocate generally along an axis of operation in response to rotation of the output gear. The output gear may include a body portion; a recess formed in the body portion; and a hub portion coupled in the recess, the hub portion being coupled to a central shaft defining an axis of rotation of the output gear. At least one rotating counterweight member may be coupled to the hub portion and coupled in the recess, between the hub portion and the body portion of the output gear. A clutching system may be coupled in the recess of the output gear, between the hub portion and the body portion.

In some implementations, the at least one rotating counterweight member, the hub portion and the body portion of the output gear are configured to rotate together about the central axis of rotation in response to a driving force from the driving system. The at least one rotating counterweight member may include a first rotating counterweight member positioned at a first side of the axis of operation and configured to rotate about the central axis of rotation together with the output gear; and a second rotating counterweight member positioned at a second side of the axis of operation and configured to rotate about the central axis of rotation together with the output gear and the first rotating counterweight member. One of the first rotating counterweight member or the second rotating counterweight member may be coupled to the hub portion and received in the recess formed in the body portion of the output gear.

In some implementations, the reciprocating power tool may include a rocking counterweight member having a first end portion pivotably coupled to the housing, and a second end portion thereof eccentrically coupled to the output gear. The rocking counterweight member may be configured to perform a rocking motion in response to rotation of the output gear.

In some implementations, the first and second rotating counterweight members may be configured to rotate together with the output gear, and to balance forces generated by reciprocating motion of the shaft along the axis of operation when the first and second counterweight members are positioned in phase with reciprocating motion of the shaft along the axis of operation; and the rocking counterweight member may be configured to balance forces generated by the first and second rotating counterweight members when the first and second rotating counterweight members are positioned out of phase with reciprocating motion of the shaft along the axis of operation.

In some implementations, the clutching system and the first rotating counterweight member fixed in the recess of the output gear may be configured to maintain synchronized operation of the rotation of the output gear and the first and second counterweight members about the central axis of rotation, rocking motion of the rocking counterweight member with respect to the central axis of rotation, and the reciprocating motion of the shaft along the axis of operation.

In some implementations, the rocking counterweight member may include a weighted end portion positioned between the first rotating counterweight member and the second rotating counterweight member; a slot formed in the weighted end portion, wherein the slot is coupled a collar on the hub portion of the output gear; and an arm portion that is pivotably coupled to a housing of the power-driven reciprocating tool. The collar may be eccentrically positioned on the hub portion with respect to the central axis of rotation of the output gear. The slot may be slidably coupled on the collar such that the weighted end portion of the rocking counterweight member performs the rocking motion in response to rotation of the output gear. In some implementations, the reciprocating power tool may include a yoke having a first end portion thereof coupled to the shaft, and a second end portion thereof coupled to an eccentric pin provided on the hub portion of the output gear, coaxially arranged with the collar, such that the yoke is aligned with the axis of operation of the shaft and the second end portion of the yoke is positioned between the first and second rotating counterweight members.

The details of one or more implementations are set forth in the accompanying drawings and the description below. Other features will be apparent from the description and drawings, and from the claims.

BRIEF DESCRIPTION OF THE DRAWINGS

FIGS. 2C(1) and 2C(2) are top views.

DETAILED DESCRIPTION

Figure 1:
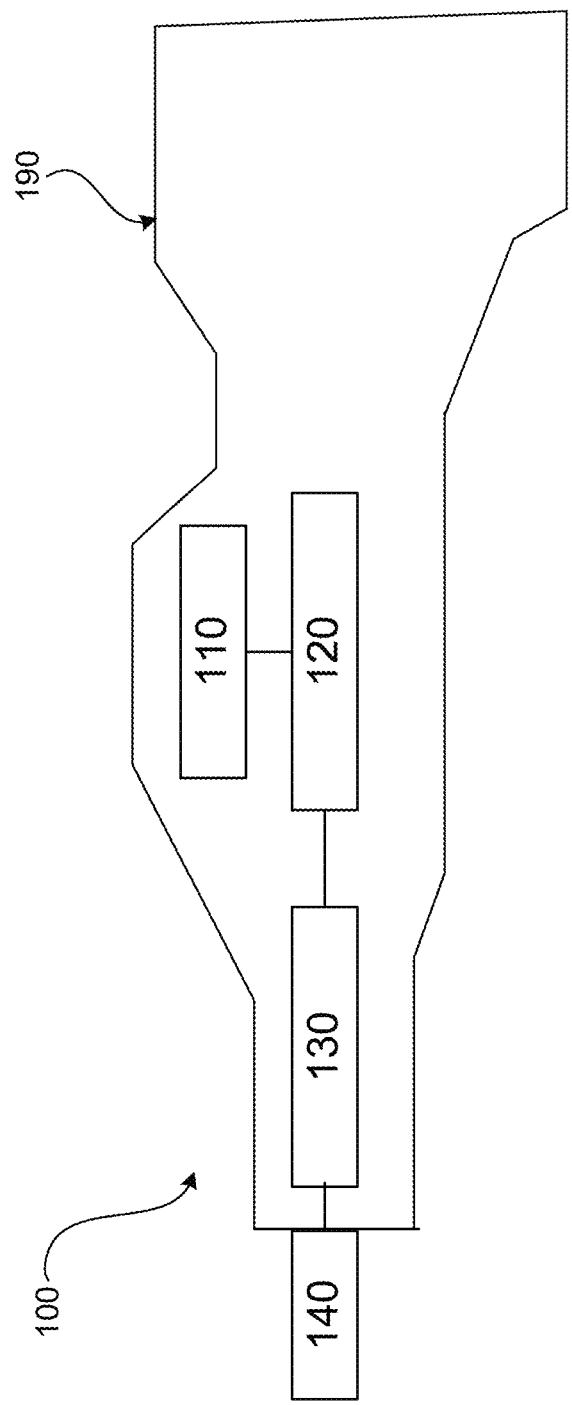
FIG. 1 is a schematic view of an example reciprocating power tool.

A schematic view of an example power tool 100 including a reciprocating mechanism is shown in FIG. 1. The example tool 100 includes a driving mechanism 110 generating a driving force, for example, a rotational driving force. A transmission mechanism 120 is coupled between the driving mechanism 110 and a reciprocating mechanism 130. The transmission mechanism 120 transfers the driving force generated by the driving mechanism 110 to the reciprocating mechanism 130. In an arrangement in which the driving force generated by the driving mechanism 110 is a rotational force, or a rotational motion, the rotational motion produced by the driving mechanism 110 may be converted into a reciprocating force, or reciprocating motion to be output by an output accessory 140 such as, for example, a blade coupled to the reciprocating mechanism 130. The tool 100 may be operable in a linear mode of operation, in which the reciprocating motion is a linear reciprocating motion. The tool 100 may be operable in an orbital mode of operation, in which the reciprocating motion is an orbital reciprocating motion. The driving mechanism 110, the transmission mechanism 120, and the reciprocating mechanism 130 may be received in and/or coupled to a housing 190. The output accessory 140 coupled to the reciprocating mechanism 130 may extend from the housing 190, to interact with a workpiece (not shown in FIG. 1). In some implementations, the driving mechanism 110 may be an electric motor that receives power from, for example, a power storage device (such as, for example, a battery), an external electrical power source, and the like. In some implementations, the driving mechanism 110 may be an air driven, or pneumatic motor, that is powered by compressed air introduced into the housing 190 from an external compressed air source. Other types of driving mechanisms, and other sources of power, may provide for power driven operation of the tool 100.

In a power tool that makes use of reciprocal motion, vibration may be generated by multiple sources. For example, vibration may be generated by interaction forces, or frictional forces between a cutting implement, such as a blade, coupled to the output accessory 140 and a work piece during operation. Inertial forces, due to relative movement of the internal components of the tool 100, may cause instability and/or vibration, whether or not the tool 100 is engaged with a work piece. For example, as internal components of the various mechanisms of the tool 100 move and change direction, reaction forces are generated to accelerate/decelerate the component(s). An example of this may be the reaction forces generated due to the reciprocal motion of a reciprocating shaft of a reciprocating mechanism of a power tool. In a situation in which the tool 100 is not rigidly fixed to a mounting surface, but rather, held by an operator, the cyclic nature of this type of motion results in vibration experienced by the operator. The reciprocating motion of the reciprocating mechanism/output accessory 140 may cause opposite, reciprocal motion to be felt, or experienced by the operator, as vibration. This vibration may adversely affect precision and utility of the tool 100.

A reciprocating power tool, in accordance with implementations described herein, includes a counterbalance mechanism that counteracts vibratory forces that would otherwise adversely affect operability of the tool. In some implementations, the counterbalance mechanism includes counterweighting features incorporated into the reciprocating power tool to counteract inertial forces generated by reciprocal operation of a reciprocating shaft of the reciprocating power tool. In some examples, the counterweighting features include a pair of counterweighting features that are coupled on opposite sides of the reciprocating shaft, and that rotate with a gear mechanism driving the reciprocating shaft, to move the center of gravity of the counterweighting features into alignment with that of the reciprocating shaft. This may balance, or reduce or substantially eliminate, forces at least in a first direction, generated when the center of gravity of the counterweighting feature(s) is otherwise offset from that of the reciprocating shaft. In some examples, the counterbalance mechanism includes a counterweight feature that is coupled between the gear mechanism and a remote pivot, to balance, or reduce or substantially eliminate, forces in at least a second direction.

Figure 2A:
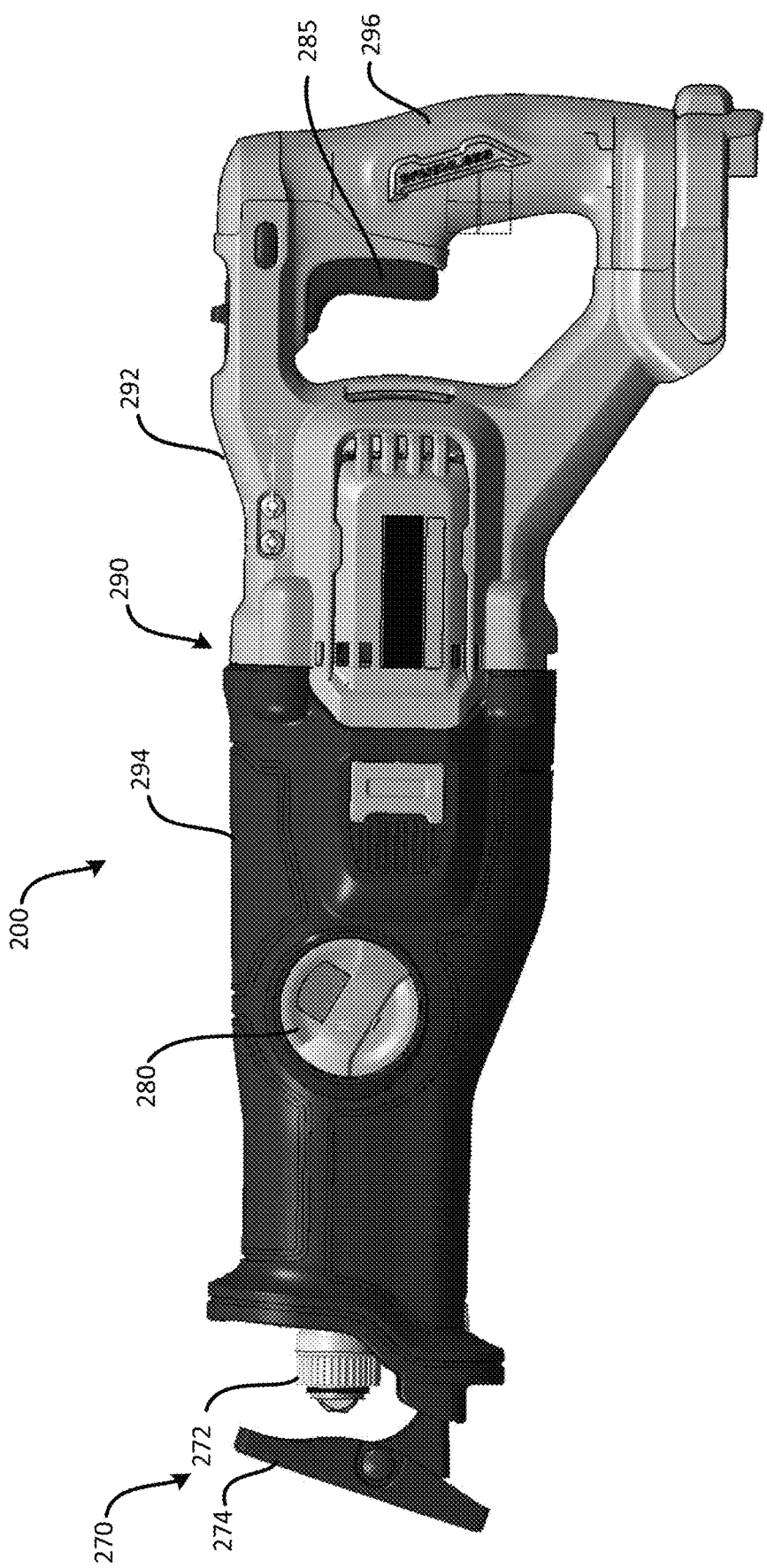
FIG. 2A is a side view of an example power tool including a reciprocating mechanism.
Figure 2B:
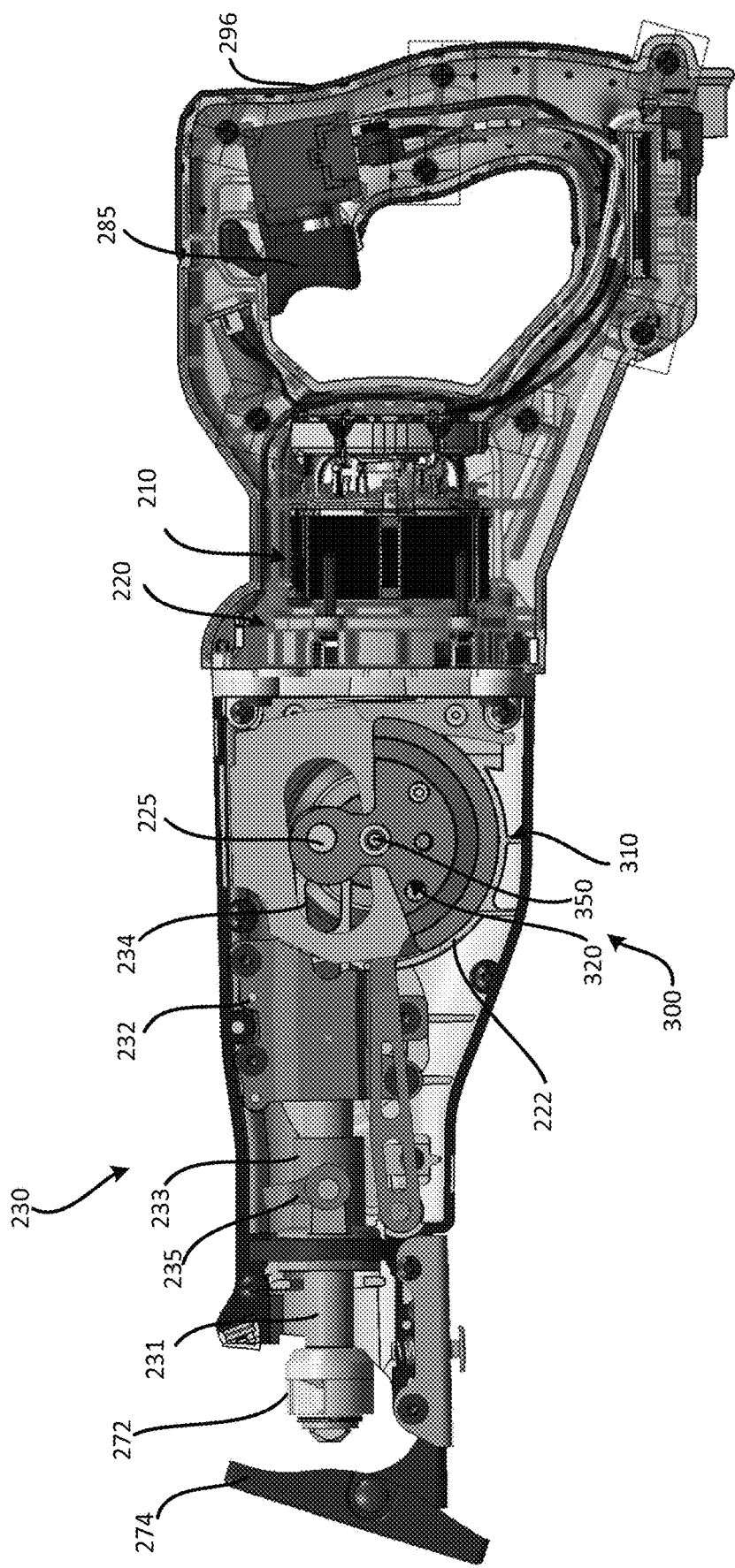
FIG. 2B is a side view of the example reciprocating power tool shown in FIG. 2A, with a portion of a housing removed.
Figure 2D:
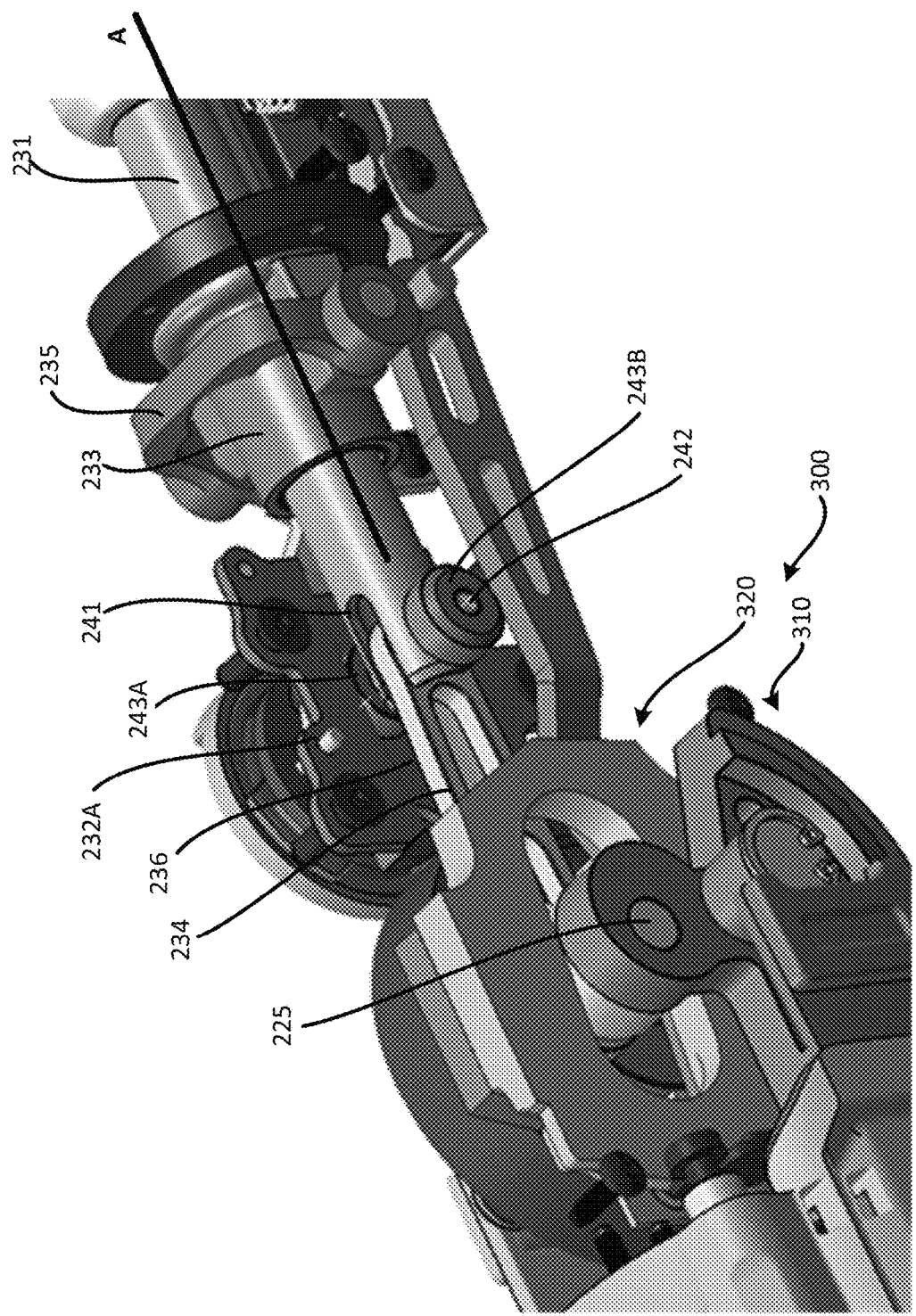
FIG. 2D is a perspective view, of internal components of the example reciprocating power tool shown in FIGS. 2A and 2B.
Figure 3:
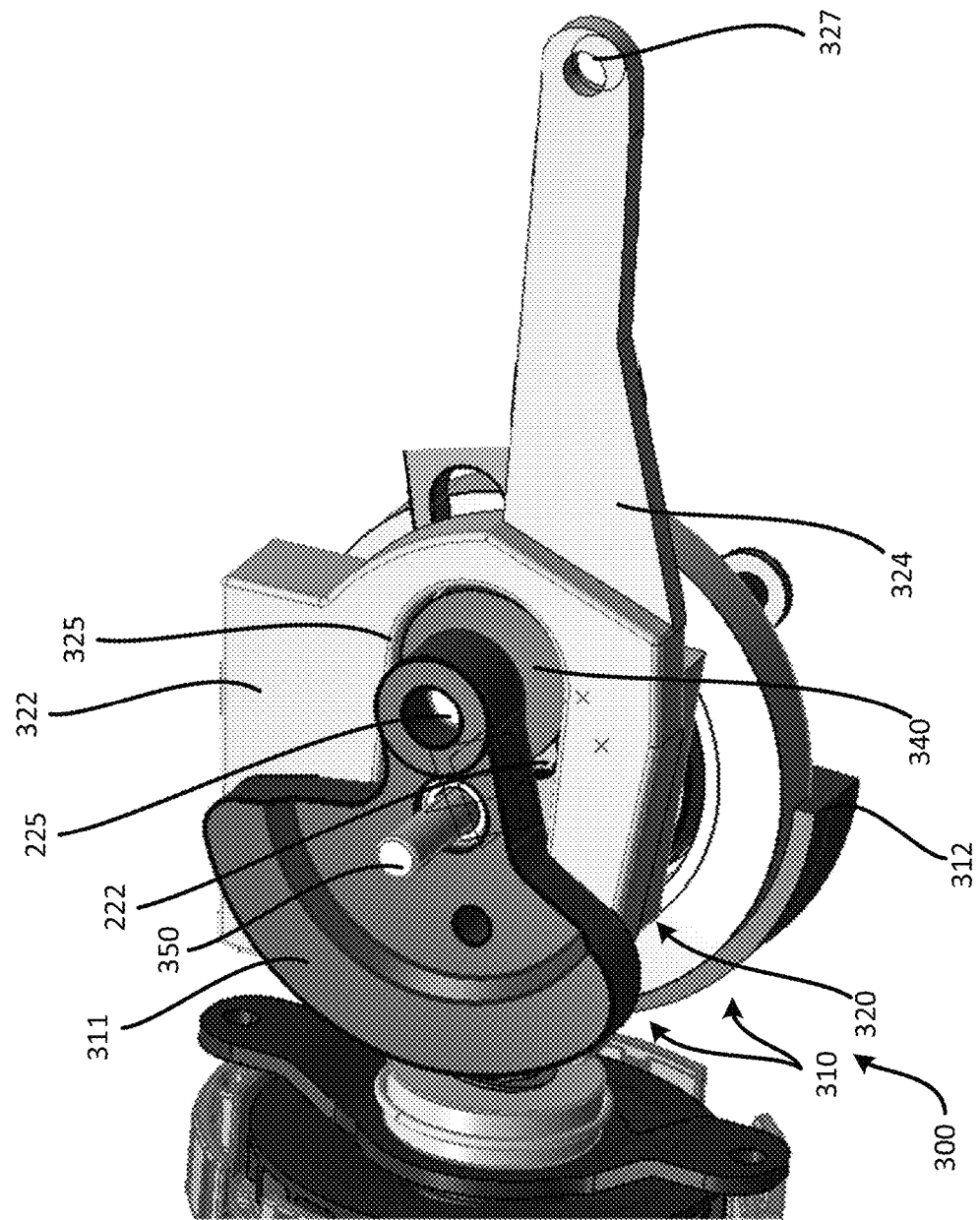
FIG. 3 is an exploded view of an example counterbalancing mechanism of the example reciprocating power tool shown in FIGS. 2A-2D.

FIG. 2A is a side view of an example reciprocating power tool 200, including an example counterbalance mechanism 300, in accordance with implementations described herein. FIG. 2B is a side view of the example power tool 200 shown in FIG. 2A, with a portion of a housing 290 of the tool 200 removed so that internal components are visible. FIG. 2B is a side view of the example tool 200 shown in FIG. 2A, with a portion of the output housing 294 removed so that internal components of the tool 200 are visible. FIG. 2C is a top view, and FIG. 2D is a top perspective view, of some of the internal components of the example tool 200 shown in FIGS. 2A and 2B. FIG. 3 is a top perspective view, in which components of the counterbalance mechanism 300 are more easily visible. The example power tool 200 shown in FIGS. 2A-2D and 3 is a reciprocating power tool, and in particular, a reciprocating saw, simply for purposes of discussion and illustration. The principles to be described herein may be applied to other types of power tools that implement reciprocating motion, such as, for example, jig saws, scroll saws, oscillating tools, and the like.

The example tool 200 may include a housing 290 in which components of the tool 200 are received. In the example shown in FIGS. 2A-2D, the housing 290 includes a motor housing 292 in which a driving system, such as a motor, is received, and an output housing 294 in which output components of the tool 200 are received. One or more selection mechanisms 280 provide for selection of an operating mode of the tool 200. In the example shown in FIGS. 2A-2D, the tool 200 includes a selection mechanism 280 provided on the output housing 294. The selection mechanism 280 provides for selection of an operation mode from a plurality of operation modes. The plurality of operation modes may include, for example, a linear mode of operation or an orbital mode of operation. An accessory tool coupling device 270 provides for coupling of an accessory tool, for example, a blade (not shown in FIG. 2A) to the example tool 200. In the example shown in FIGS. 2A and 2B, the accessory tool coupling device 270 includes a tool holder (sometimes alternatively referred to as a clamp) 272, provided at a distal end portion of a reciprocating shaft of the reciprocating mechanism 230 housed in the output housing 294. A cleat 274 may be selectively coupled to the output housing 294 and arranged proximate the tool holder 272 to guide a position of the tool 200 relative to a workpiece and maintain alignment of an accessory tool coupled in the tool holder 272 relative to the workpiece. A trigger 285 provided on a handle portion 296 of the housing 290 may be selectively manipulated by the user for operation of the tool 200.

A driving mechanism including, for example, a motor 210 and a transmission 220, and a reciprocating mechanism 230 are received in the housing 290 of the tool 200. The transmission 220 may convert a driving force, for example, a rotational force, generated by the driving mechanism including the motor 210 and the transmission 220, to a reciprocating linear force to be output by the reciprocating mechanism 230. In some implementations, a counterweighting mechanism 300 is coupled to the reciprocating mechanism 230 to counteract imbalances generated by the driving mechanism including the motor 210 and the transmission 220 and/or the reciprocating mechanisms 230 during operation. The example reciprocating mechanism 230 shown in FIGS. 2B-2D includes a reciprocating shaft 231 having a first end portion thereof coupled to a guide bracket 232. In some examples, the guide bracket 232 is, in turn, coupled to, for example a portion of the housing 290 such that the guide bracket 232 is fixed and remains stationary within the housing 290. The tool holder 272 is coupled to a second end portion of the reciprocating shaft 231. An intermediate portion of the reciprocating shaft 231 is slidably received in a bushing 233. In some examples, the bushing 233 is coupled to the selection mechanism 280 via a pivot bracket 235, such that the orbit bushing 233 is movable within the housing 290 in response to manipulation of the selection mechanism 280, to adjust a position and/or an orientation of the reciprocating shaft 231 relative to the guide bracket 232. A yoke 234 has a first end portion coupled to the first end portion of the reciprocating shaft 231, and a second end portion coupled to an output gear 222 of the transmission 220. For example, the second end portion of the yoke 234 may be coupled to a pin 225 of the output gear 222. The pin 225 may be eccentrically positioned relative to a center of rotation of the output gear 222. Rotation of the output gear 222 causes reciprocating motion of the second end portion of the yoke 234 coupled to the pin 225, in turn causing reciprocal motion of the reciprocating shaft 231 coupled to the first end portion of the yoke 234.

As shown in FIG. 2C(1), the guide bracket 232 includes a first guide bracket 232A coupled to a second guide bracket 232B to define an internal space therebetween in which the first end portion of the reciprocating shaft 231 is slidably received. In the view shown in FIG. 2C(2), the first guide bracket 232A and the output gear 222 are removed, and in the perspective views illustrated in FIG. 2D, the second guide bracket 232B is removed, so that interaction of the reciprocating shaft 231 and yoke 234 within the guide bracket 232 is visible. A closer in perspective view of the counterbalance mechanism 300 is shown in FIG. 3. A slot 241 is formed in the first end portion of the reciprocating shaft 231, with the first end portion of the yoke 234 positioned in the slot 241. A shaft 242 extends through an opening in a first side wall of the first end portion of the reciprocating shaft 231, through the first end portion of the yoke 234, and out through a corresponding opening in a second side wall of the reciprocating shaft 231. A first roller 243A is coupled to a first end of the shaft 242 at the first side wall of the first end portion of the reciprocating shaft 231, and a second roller 243B is coupled to a second end of the shaft 242 at the second side wall of the first end portion of the reciprocating shaft 231. The first roller 243A is received in a guide slot 236A defined in the first guide bracket 232A. The second roller 243B is received in a guide slot 236B defined in the second guide bracket 232B (not shown in FIG. 2D). Rolling motion of the rollers 243A, 243B in the guide slots 236 of the respective guide brackets 232A, 232B guides the reciprocating motion of the reciprocating shaft 231.

As noted above, in some implementations, the power tool 200 shown in FIGS. 2A-2D and 3 may include a counterbalance mechanism 300. The example counterbalance mechanism 300 includes a first counterbalance device 310 and a second counterbalance device 320. In this example arrangement, the first counterbalance device 310 is a rotating counterbalance device coupled to a central shaft 350 defining a central axis of rotation of a hub portion 352 of the output gear 222, such that the first counterbalance device 310 rotates together with the output gear 222 about the central axis of rotation (defined by the central shaft 350) of the output gear 222/hub portion 352. The hub portion 352 is coupled in a recess 332 formed in a body portion 331 of the output gear 222. In this example arrangement, the second counterbalance device 320 is a rocking counterbalance device that is coupled between the central shaft 350 defining the central axis of rotation of the output gear 222 and a remote pivot point at, for example, the housing 290 of the tool. The first counterbalance device 310 and the second counterbalance device 320 of the counterbalance mechanism 300 may work together to balance forces generated due to the interaction of the rotating and reciprocating components of the tool 200.

The first counterbalance device 310 includes a first rotating counterweight member 311 and a second rotating counterweight member 312. The first and second rotating counterweight members 311, 312 are fixed to the central shaft 350 such that the first and second rotating counterweight members 311, 312 rotate together with the output gear 222. The second counterbalance device 320 is a rocking counterbalance device 320 including a weighted end portion 322 having a slot portion 325 that is movably coupled on a collar 340 positioned between the first rotating counterweight member 311 and the hub portion 352. In the example arrangement shown in FIG. 3, the collar 340 is aligned with, or coaxially arranged with, the eccentric pin 225 to which the second end portion of the yoke 234 is coupled, such that the collar 340 is offset from, or eccentric relative to the center of rotation of the output gear 222 at the central shaft 350 defining the central axis of rotation of the hub portion 352 and output gear 222. An arm portion 324 includes a pivot joint 327 that is pivotably coupled to, for example a portion of the housing 290. As the output gear 222 rotates, the pivotal coupling of the arm portion 324 and movable coupling of the slot portion 325 on the eccentric collar 340 causes a rocking motion of the weighted end portion 322 of the rocking counterbalance device 320.

The reciprocating shaft 231 and the first end portion of the yoke 234 coupled to the first end portion of the reciprocating shaft 231 may reciprocate along an axis of operation A (see FIGS. 2C and 2D). Reciprocation of the reciprocating shaft 231/yoke 234 along the axis of operation A, and changes in direction as the reciprocating shaft 231 moves in a first direction during the out stroke, and then in a second direction for the return stroke, generates inertial forces that will be transferred to the user of the tool 200 in absence of any counterbalancing of these inertial forces. In some examples, these inertial forces may be counterbalanced by the addition of rotating counterbalancing features. In the example arrangements shown in FIGS. 2B-3, the second end portion of the yoke 234 is coupled to the pin 225 (i.e., the eccentric pin on the hub portion 352 of the output gear 222), the first rotating counterweight member 311 is positioned on a first side of the yoke 234/reciprocating shaft 231, and the second rotating counterweight member 312 is positioned on a second side of the yoke 234/reciprocating shaft 231. That is, in this example arrangement, the first and second rotating counterweight members 311, 312 are positioned on opposite sides of the axis of operation A. This positioning of the first and second rotating counterweight members 311, 312 on opposite side of the axis of operation A along which the reciprocating motion is carried out provides a measure of transverse balance of the first counterbalance device 310 as the reciprocating mechanism 300 reciprocates during operation of the tool 200.

Figure 4A:
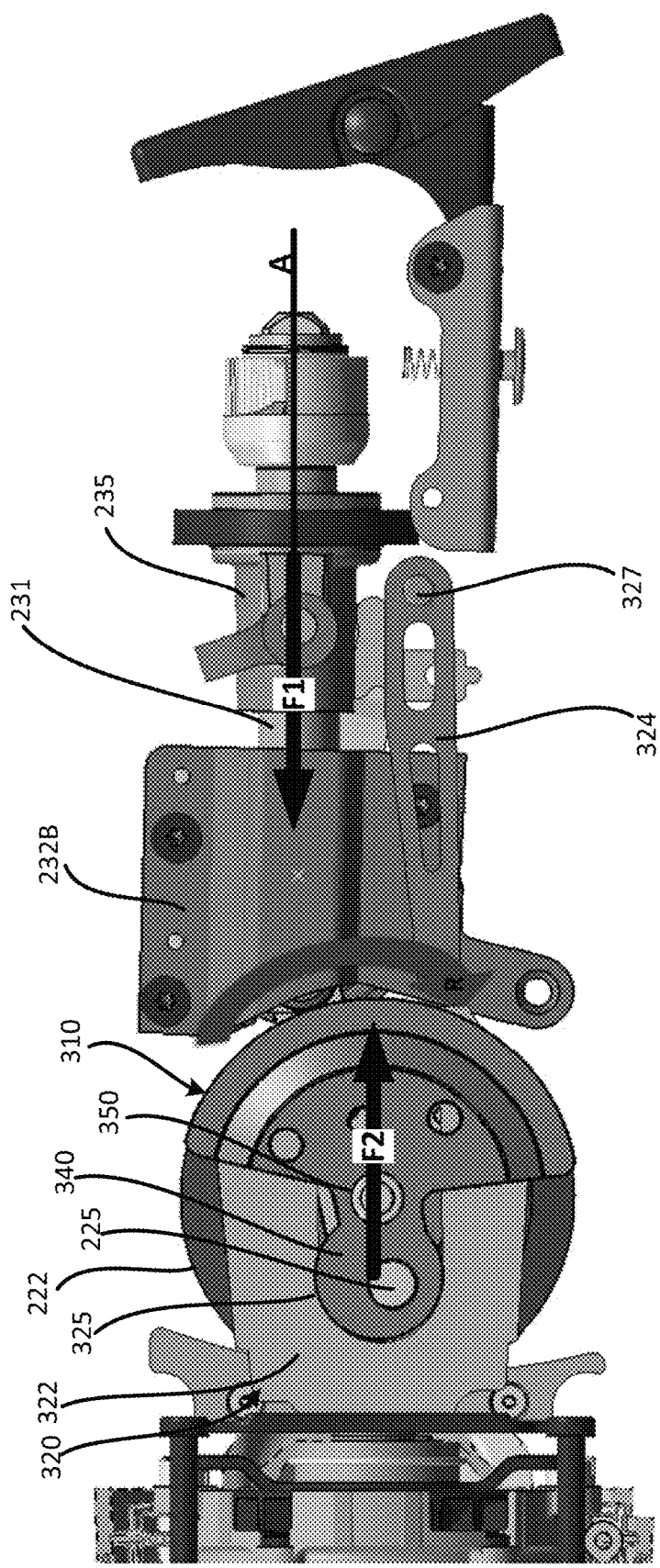
FIGS. 4A-4E illustrate operation of an example counterbalancing mechanism of the example reciprocating power tool shown in FIGS. 2A-2D.

FIGS. 4A-4E illustrate the relative positions of the reciprocating shaft 231, first counterbalance device 310 and second counterbalance device 320 through a full stroke, i.e., an out stroke and a return stroke, of the reciprocating mechanism 300 (360° rotation of the output gear 222). In FIG. 4A, the reciprocating shaft 231 is in a substantially fully retracted position (referred to as 0° and 360° of rotation of the output gear 222), prior to initiation of the outstroke. In FIG. 4A, the first counterbalance device 310 (including the first rotating counterweight member 311 and the second rotating counterweight member 312 which rotate together with the output gear 222 in the direction of the arrow R) is positioned at approximately 90 degrees of rotation from a top dead center position, and substantially aligned with/oriented in parallel to the axis of operation A of the reciprocating mechanism/reciprocating shaft 231. In FIG. 4A, the position of the first counterbalance device 310 (including the first and second rotating counterweight members 311, 312) may be considered to be in phase with the reciprocating motion of the reciprocating shaft 231 along the axis of operation A. In the arrangement shown in FIG. 4A, a force F1 generated due to the reciprocating motion of the reciprocating shaft 231 is balanced by a force F2 produced as the first counterbalance device 310 as the forces F1 and F2 are substantially aligned/parallel to the axis of operation A in opposite directions. In the arrangement shown in FIG. 4A, the second counterbalance device 320 is in a substantially neutral position. With the forces F1 and F2 exerted in substantially opposite directions, aligned substantially in parallel with the axis of operation A, the forces generated by the reciprocating motion of the reciprocating shaft 231 are balanced by the mass of the first counterbalance device 310.

Figure 4B:
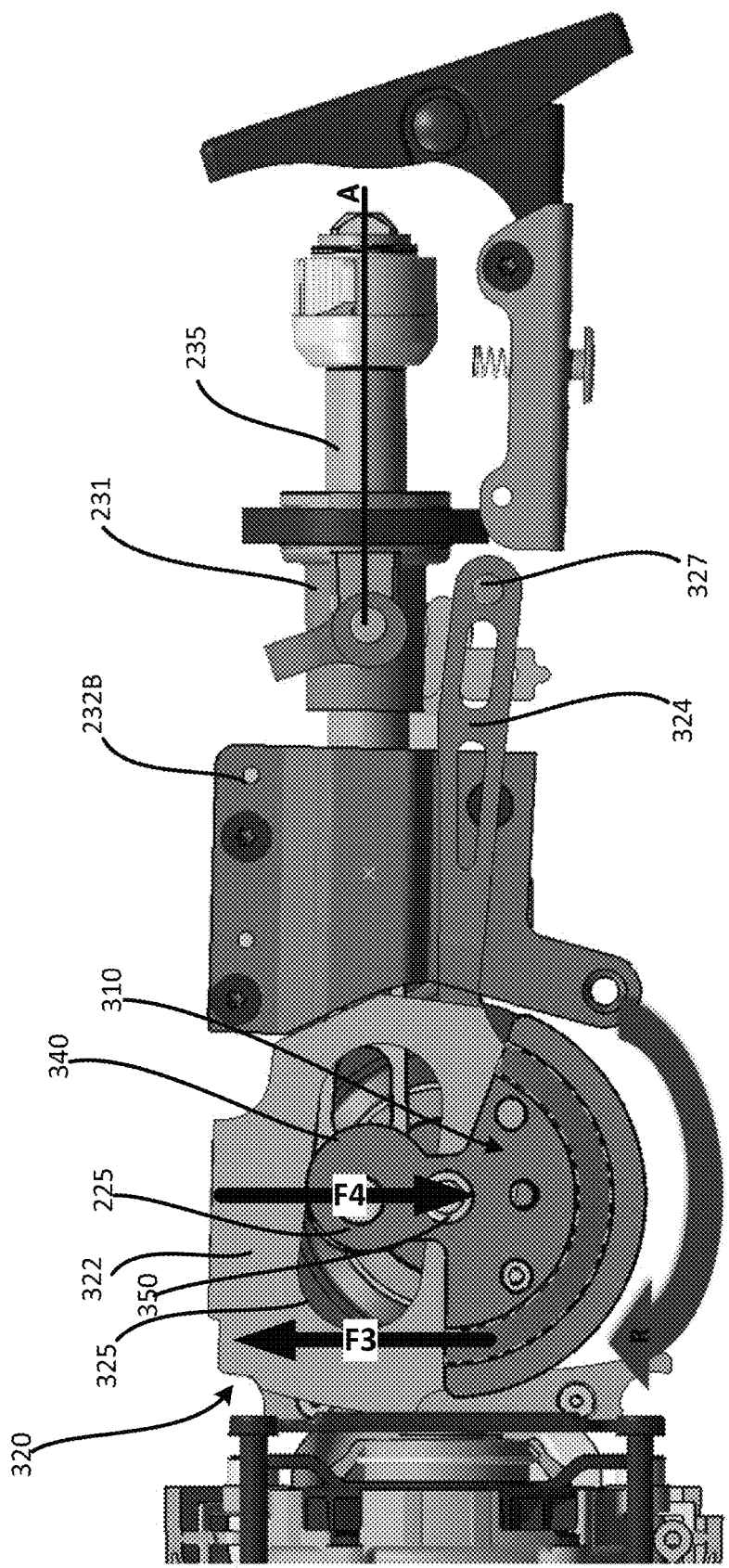

As the output gear 222 continues to rotate in the direction of the arrow R, from the position shown in FIG. 4A to the position shown in FIG. 4B, the reciprocating shaft 231 initiates the out stroke and moves from the fully retracted position shown in FIG. 4A to the partially extended position shown in FIG. 4B. In FIG. 4B, the first counterbalance device 310 has rotated approximately 90 degrees from the position shown in FIG. 4A, and the force F4 exerted by the mass of the first counterbalance device 310 has moved out of the parallel alignment with the axis of operation A of the reciprocating shaft 231. In FIG. 4B, the position of the first counterbalance device 310 may be considered to be out of phase with the reciprocating motion of the reciprocating shaft 231 along the axis of operation A. The rotation of the output gear 222 and corresponding eccentric movement of the offset, or eccentric collar 340 within the slot portion 325 has also caused the weighted end portion 322 of the second counterbalance device 320 to shift upwards, such that a force F3 exerted by the mass of the weighted end portion 322 of the second counterbalance device 320 balances the force F4 generated by the position of the first and second rotating counterweight members 311, 312 of the first counterbalance device 310. Without the offset provided by the force F3 of the rocking counterweight device 320, the position of the first and second rotating counterweight members 311, 312 would generate an imbalance that would result in vibratory forces felt by the user and potentially affecting precision of the tool 200.

Figure 4C:
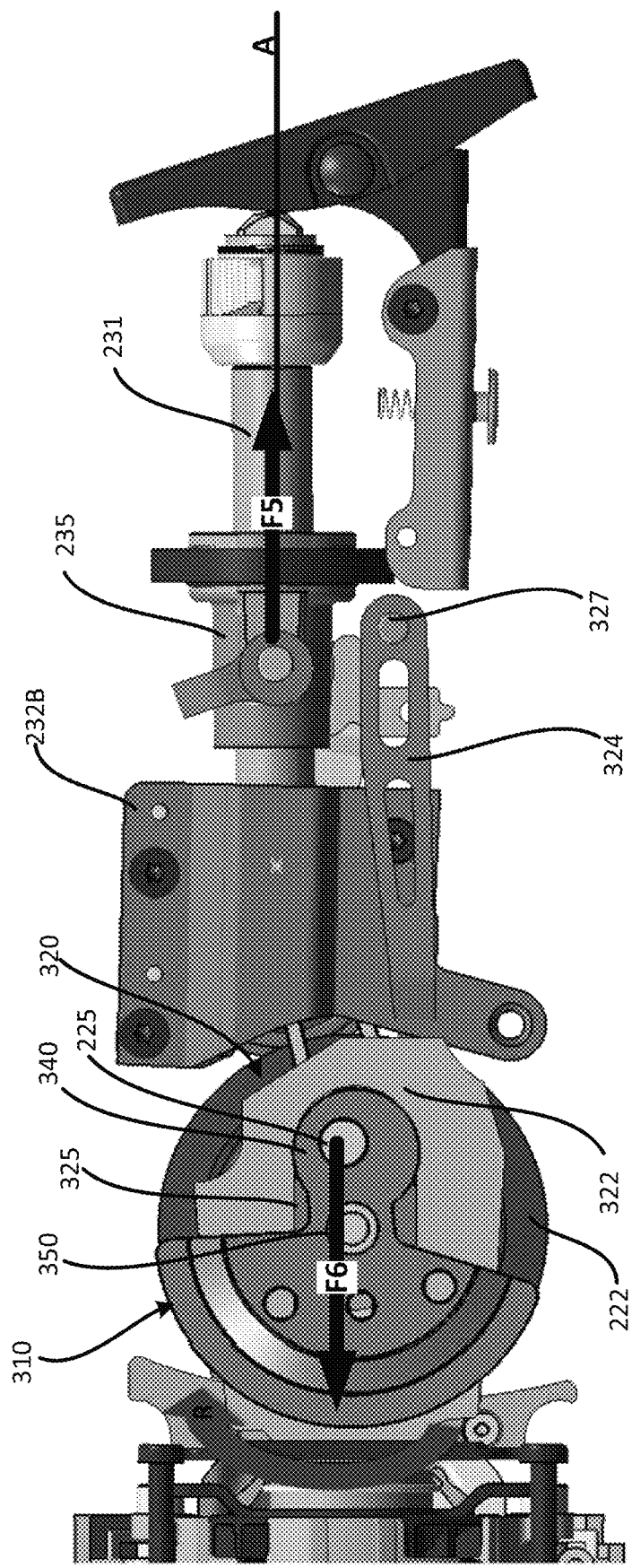

As the output gear 222 continues to rotate in the direction of the arrow R, from the position shown in FIG. 4B to the position shown in FIG. 4C, the reciprocating shaft 231 is in a substantially fully extended position, and the first counterbalance device 310 has rotated approximately 90 degrees from the position shown in FIG. 4B. In FIG. 4C, the position of the first counterbalance device 310 may be considered to be in phase with the reciprocating motion of the reciprocating shaft 231 along the axis of operation A. In the arrangement shown in FIG. 4C, a force F5 generated due to the reciprocating motion of the reciprocating shaft 231 is balanced by a force F6 produced as the first counterbalance device 310. In FIG. 4C, the second counterbalance device 320 is again in a substantially neutral position. In the arrangement shown in FIG. 4C, with the opposite forces F5 and F6 aligned in parallel with the axis of operation A, the forces generated by the reciprocating motion of the reciprocating shaft 231 are balanced by the mass of the first counterbalance device 310.

Figure 4D:
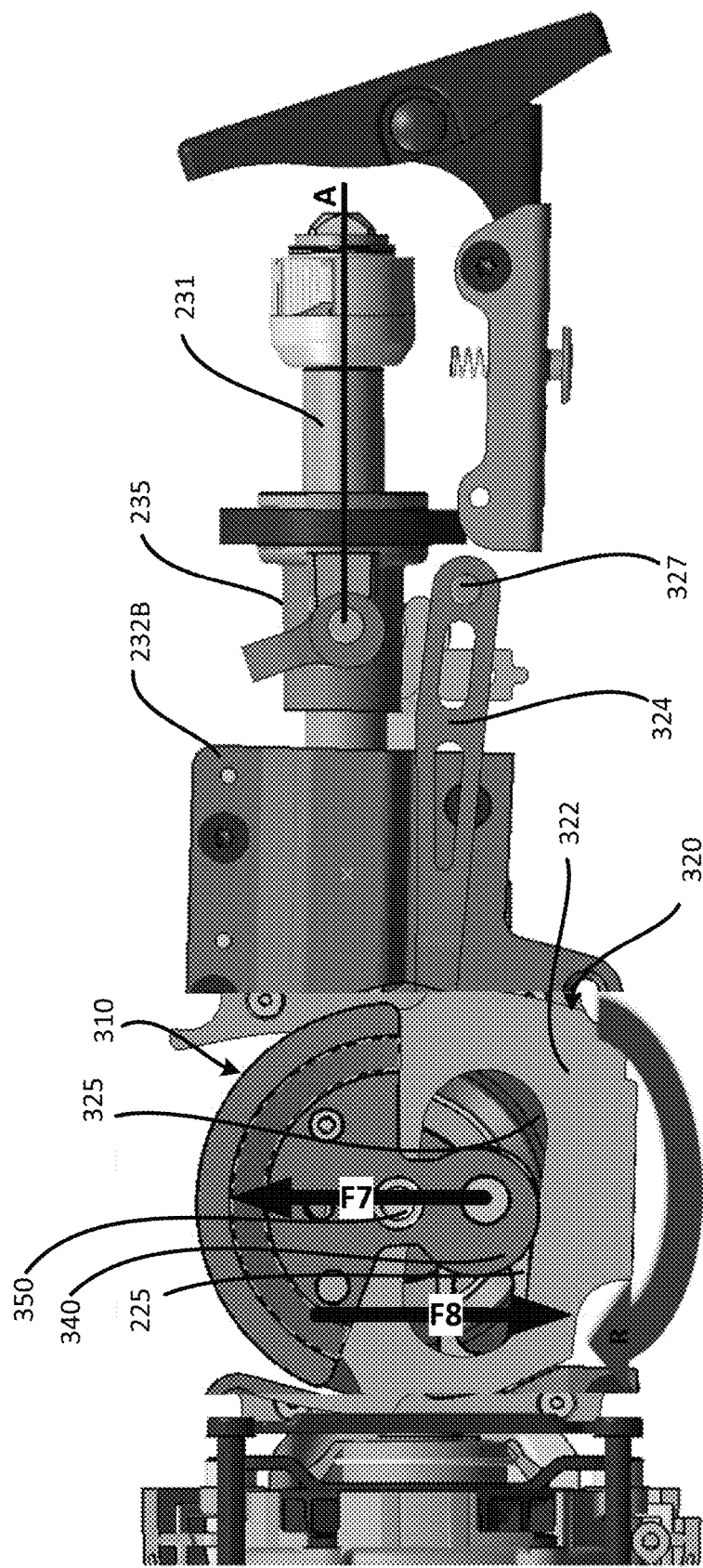

As the output gear 222 continues to rotate in the direction of the arrow R, from the position shown in FIG. 4C to the position shown in FIG. 4D, the reciprocating shaft 231 has initiated the return stroke and is in a partially retracted position, and the first counterbalance device 310 has rotated approximately 90 degrees from the position shown in FIG. 4C. In FIG. 4D, the force F7 exerted by the mass of the first counterbalance device 310 has moved out of the parallel alignment with the axis of operation A of the reciprocating shaft 231. In FIG. 4D, position of the first counterbalance device 310 may be considered to be out of phase with the reciprocating motion of the reciprocating shaft 231 along the axis of operation A. The rotation of the output gear 222 and corresponding eccentric movement of the collar 340 has also caused the weighted end portion 322 of the second counterbalance device 320 to shift downward, such that a force F8 exerted by the mass of the weighted end portion 322 of the second counterbalance device 320 balances the force F7 generated by the position of the first counterbalance device 310. Without the offset provided by the force F8 of the rocking counterweight device 320, the position of the first counterbalance device 310 would generate an imbalance that would result in vibratory forces felt by the user and potentially affecting precision of the tool 200.

Figure 4E:
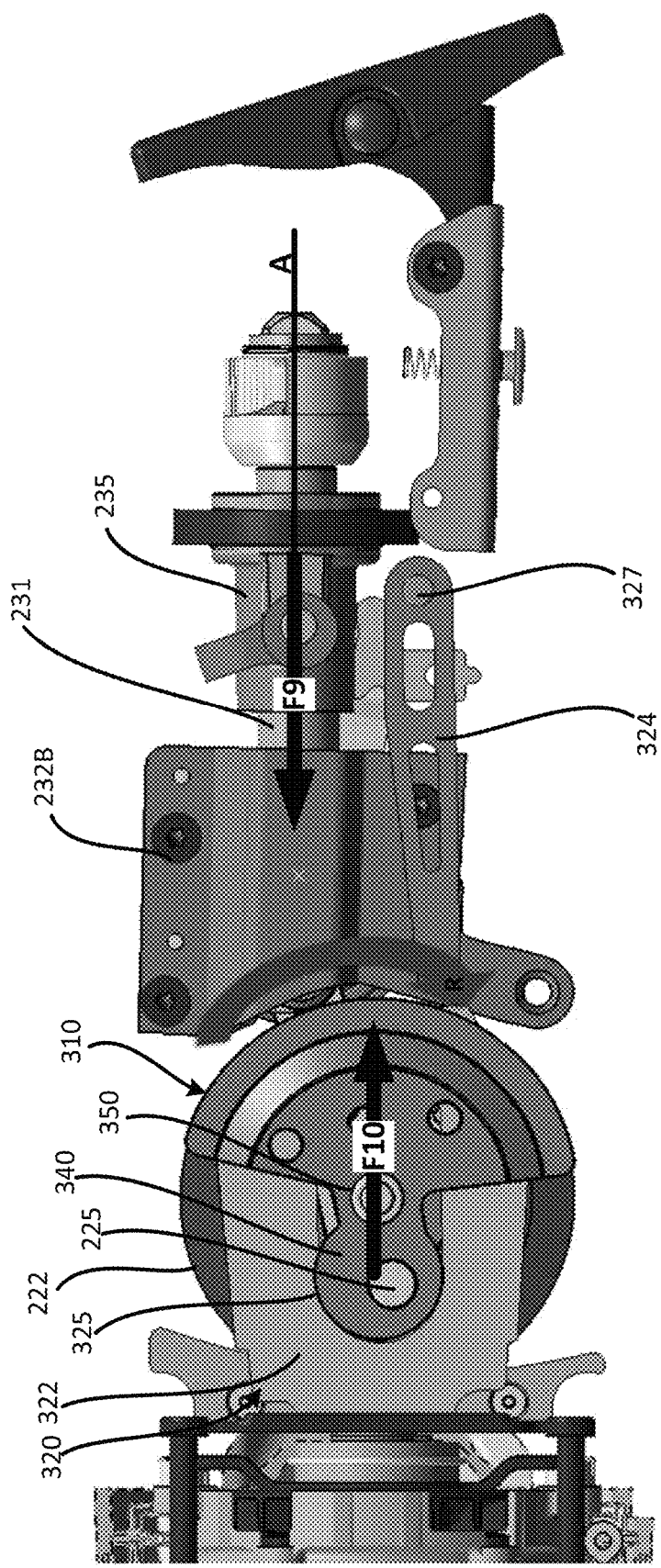

As the output gear 222 continues to rotate in the direction of the arrow R, from the position shown in FIG. 4D to the position shown in FIG. 4E, the reciprocating shaft 231 is in a substantially fully retracted position at the end of the return stroke, and the first counterbalance device 310 has rotated approximately 90 degrees from the position shown in FIG. 4D. In FIG. 4E, the position of the first counterbalance device 310 (including the first and second rotating counterweight members 311, 312) may be considered to be in phase with the reciprocating motion of the reciprocating shaft 231 along the axis of operation A. In the arrangement shown in FIG. 4E, a force F9 generated due to the reciprocating motion of the reciprocating shaft 231 is balanced by a force F10 produced as the first counterbalance device 310 including the first and second rotating counterweight members 311, 312. In the arrangement shown in FIG. 4E, the second counterbalance device 320 is in a substantially neutral position. With the forces F9 and F10 exerted in substantially opposite directions, aligned substantially in parallel with the axis of operation A, the forces generated by the reciprocating motion of the reciprocating shaft 231 are balanced by the mass of the first counterbalance device 310.

Figure 5A:
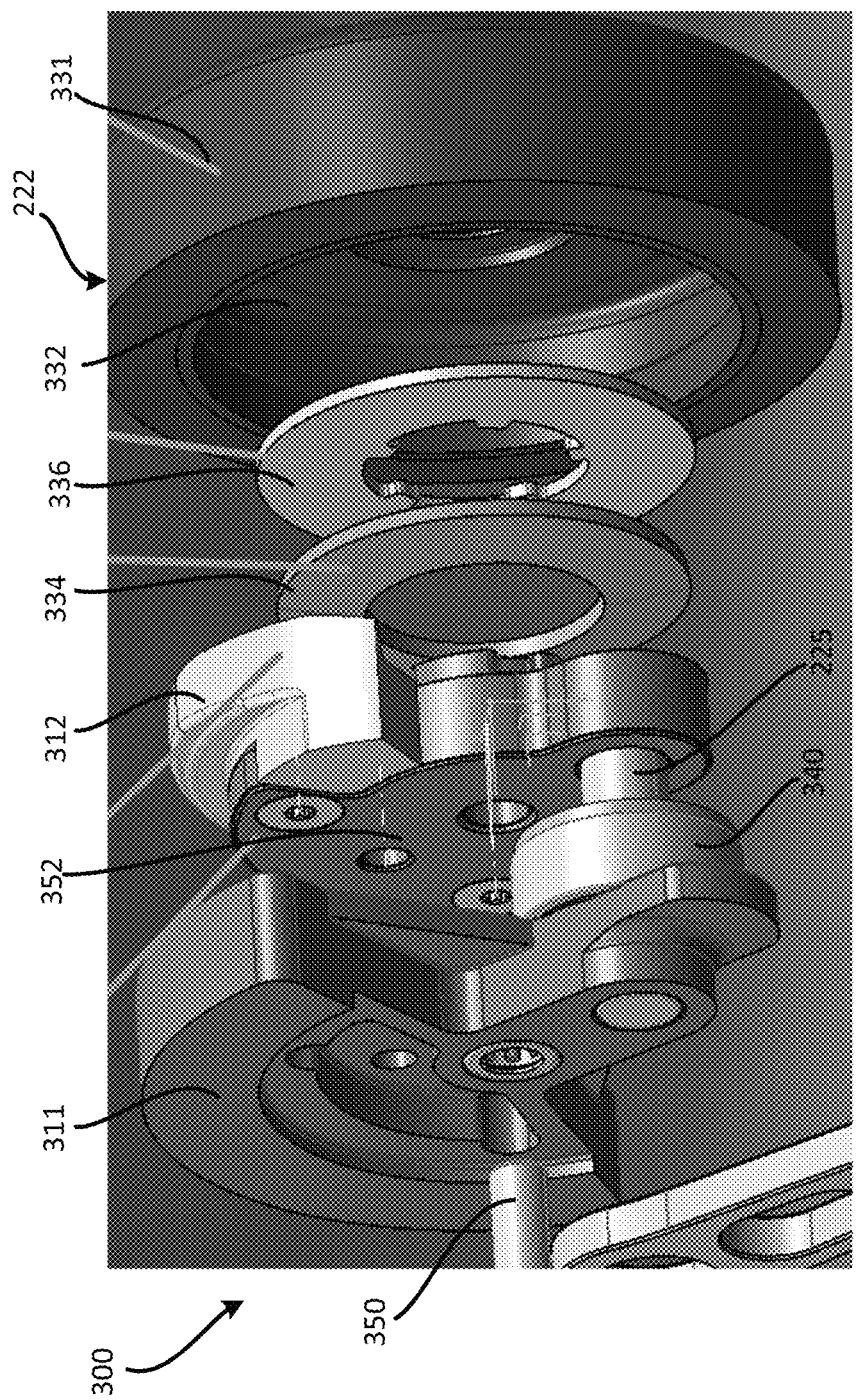
FIGS. 5A-5D illustrate interaction of the example counterbalancing mechanism with an example clutch system of the example reciprocating power tool shown in FIGS. 2A-2D.
Figure 5B:
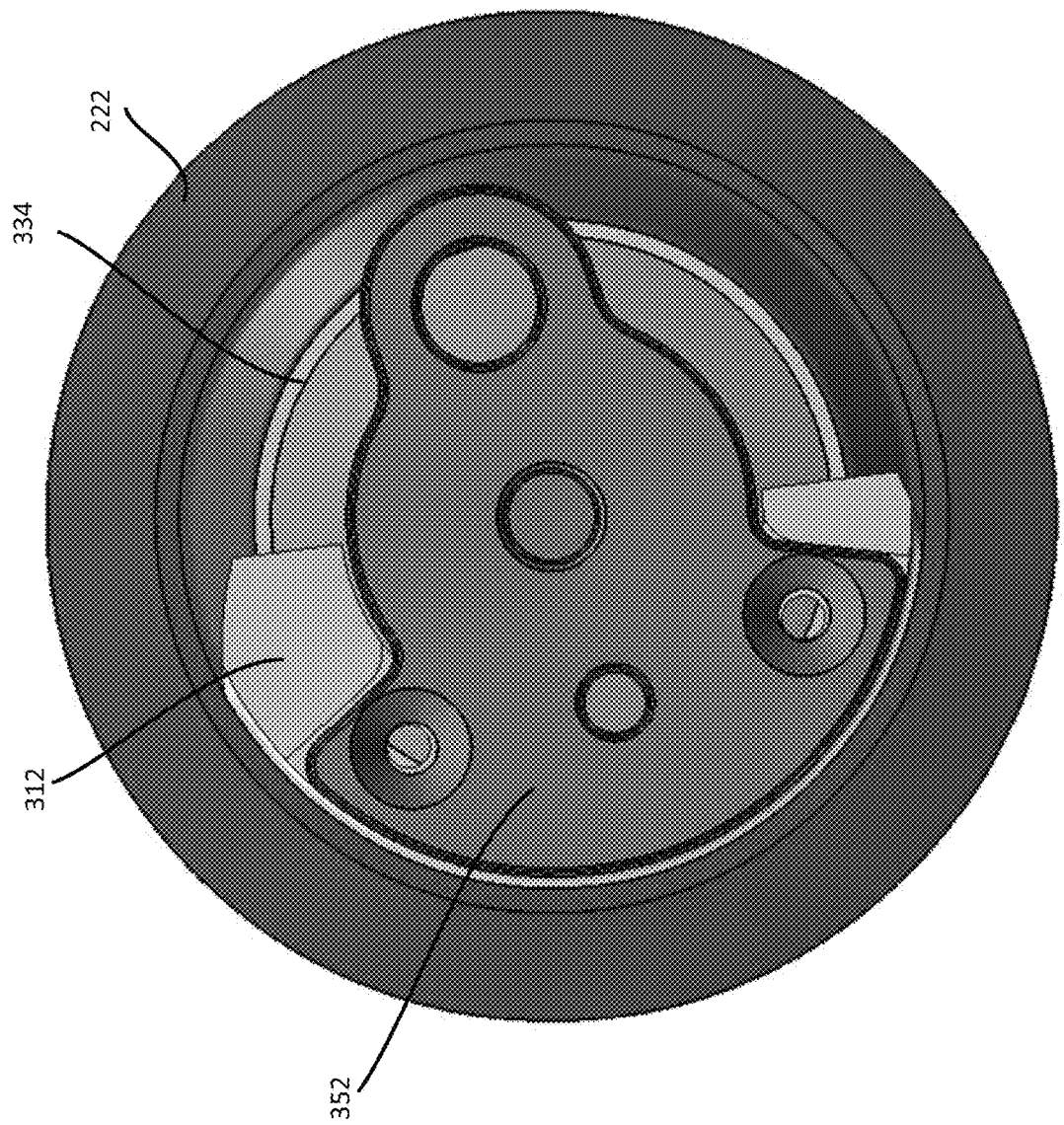
Figure 5C:
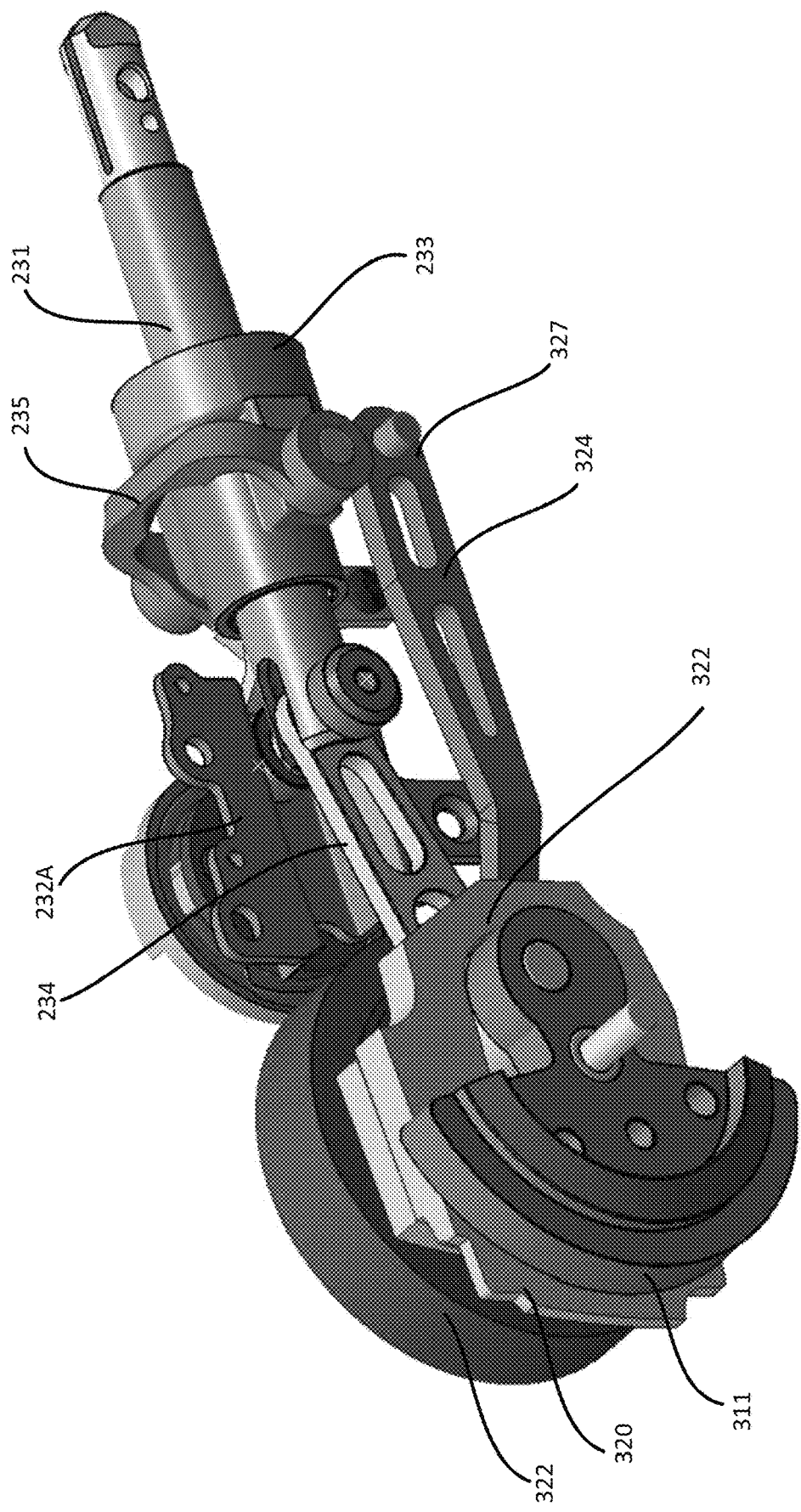
Figure 5D:
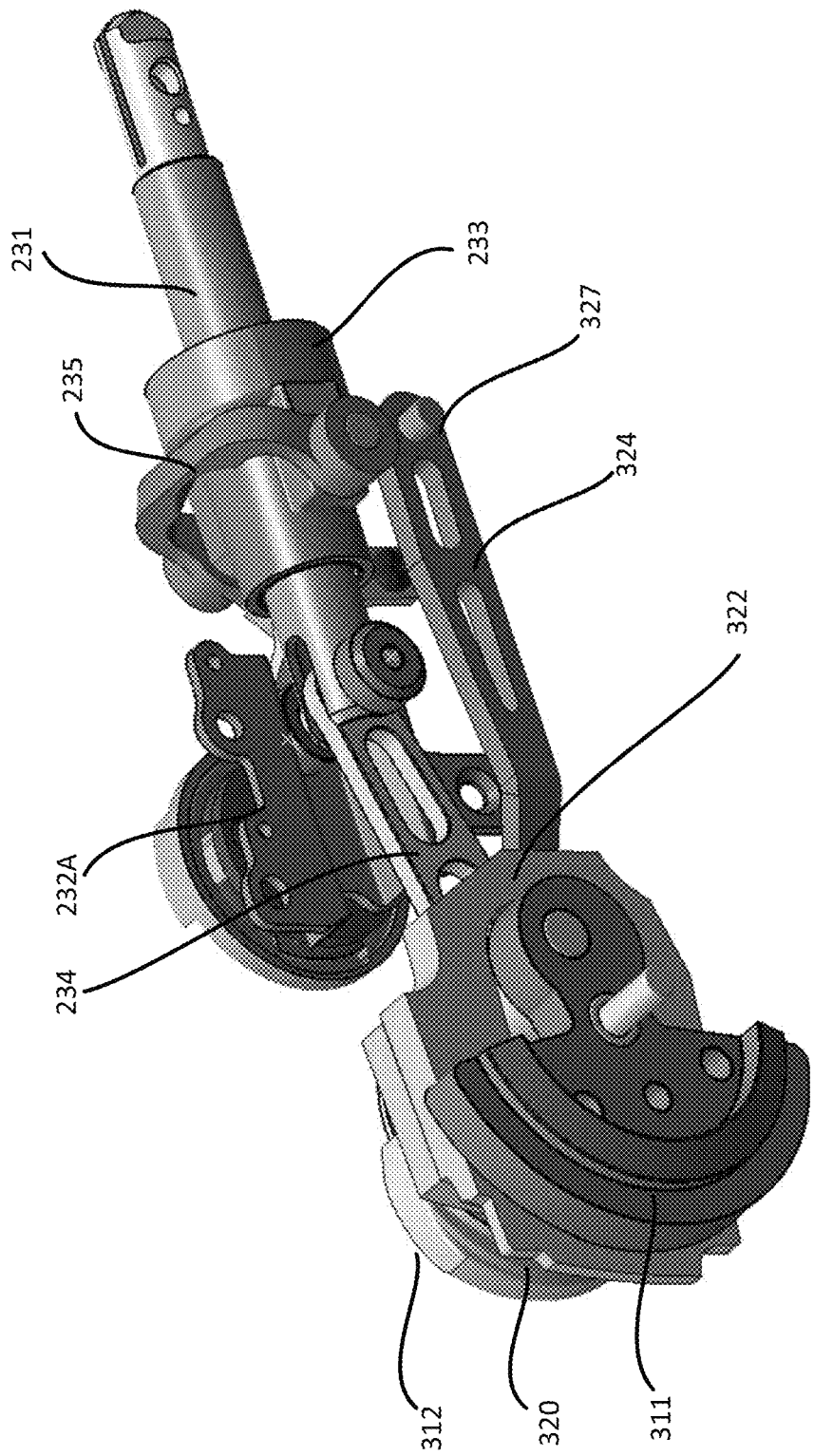

FIG. 5A is an exploded view, and FIG. 5B is an assembled view of the counterbalance mechanism 300 coupled in the output gear 222. FIG. 5C is a perspective view of the counterbalance mechanism 300, and FIG. 5D is a perspective view of the example counterbalance mechanism 300 with the output gear 222 removed so that a position of the second rotating counterweight member 312 is visible. As noted above, and as shown in FIGS. 5A and 5B, the second rotating counterweight member 312 is mounted on a hub portion 352 and received in a recess 332 of the output gear 222, with a clutch spring 334 and a clutch washer 336 positioned between the output gear 222 and the second counterweight member 312/hub portion 352. Positioning of at least a portion of the first counterbalance device 310, in particular the second counterweight member 312, in the recess 332, engaged with the clutching system (including the clutch spring 334 and the clutch washer 336) in this manner maintains engagement of the first counterbalance device 310 with the clutching system, to in turn maintain synchronization between the counterbalance mechanism 300 and the reciprocating mechanism/reciprocating shaft 231 during operation. Synchronization between the counterbalance mechanism 300 and the reciprocating mechanism/reciprocating shaft 231 during operation provides for synchronization of a position of the elements of the counterbalance mechanism 300 (i.e., the first, rotating counterbalance device 310 and the second, rocking counterbalance device 320) and a position of the reciprocating shaft 231 as described above with respect to FIGS. 4A-4E. This may allow the tool 200 to maintain balanced operation through a single full stroke (i.e., an out stroke and a return stroke) and also through numerous repeated strokes during reciprocating operation of the reciprocating power tool 200.

This arrangement also allows the mass of the first counterbalance device 310 to be split on opposite sides of the axis of operation A of the reciprocating shaft 231. That is, a single rotating counterweight on one side of the axis of operation A would generate moment forces due to the offset between the axis of operation A of the reciprocating shaft 231 and the center of gravity of the singe rotating counterweight, which would in turn generate vibratory forces that would be transmitted to the user. In contrast, the arrangement shown in FIGS. 5A-5D allows the mass of the first counterbalance device 310 (the first rotating counterweight member 311 and the second rotating counterweight member 312) to be split on opposite sides of the axis of operation A, and substantially equidistant from the first end portion of the reciprocating shaft 231, to balance moment forces that would otherwise be generated, and propagated as vibration.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A reciprocating power tool, comprising:
    a housing;
    a driving mechanism including a motor and a transmission mechanism received in the housing;
    a reciprocating mechanism received in the housing, the reciprocating mechanism including a shaft that is coupled to an output gear of the driving mechanism, wherein the shaft is configured to reciprocate along an axis of operation in response to rotation of the output gear; and
    a counterbalance mechanism, including:
        a counterbalance device eccentrically coupled to the output gear and configured to perform a rocking motion with respect to a central axis of rotation of the output gear in response to rotation of the output gear.

2. The reciprocating power tool of claim 1, wherein the counterbalance mechanism includes:
    a rocking counterweight member, including:
        a weighted end portion;
        a slot formed in the weighted end portion, wherein the slot is eccentrically coupled to a hub portion of the output gear; and
    an arm portion that is pivotably coupled to the housing of the reciprocating power tool.

3. The reciprocating power tool of claim 2, further comprising a collar provided on the hub portion of the output gear, eccentrically positioned with respect to the central axis of rotation of the output gear, wherein the slot is slidably coupled on the collar such that the weighted end portion of the rocking counterweight member performs the rocking motion in response to rotation of the output gear.

4. The reciprocating power tool of claim 3, further comprising a yoke having a first end portion thereof coupled to the shaft, and a second end portion thereof coupled to an eccentric pin provided on the hub portion of the output gear, coaxially arranged with the collar, such that the yoke is aligned with the axis of operation of the shaft and the second end portion of the yoke is positioned adjacent to the counterbalance device.

5. The reciprocating power tool of claim 2, further comprising a clutching system coupled in a recess formed in a body portion of the output gear, between the hub portion and the body portion of the output gear.

6. The reciprocating power tool of claim 1, further comprising at least one rotating counterweight member;
    wherein the output gear includes:
        a body portion;
        a recess formed in the body portion; and
        a hub portion coupled in the recess, the hub portion being coupled to a central shaft defining the central axis of rotation of the output gear; and wherein the at least one rotating counterweight member is coupled to the hub portion and coupled in the recess, between the hub portion and the body portion of the output gear.

7. The reciprocating power tool of claim 6, wherein the at least one rotating counterweight member, the hub portion and the body portion of the output gear are configured to rotate together about the axis of rotation in response to a driving force from the driving mechanism.

8. The reciprocating power tool of claim 6, wherein the at least one rotating counterweight member includes:
   a first rotating counterweight member positioned at a first side of the axis of operation and configured to rotate about the axis of rotation together with the output gear; and
   a second rotating counterweight member positioned at a second side of the axis of operation and configured to rotate about the axis of rotation together with the output gear and the first rotating counterweight member,
   wherein one of the first rotating counterweight member or the second rotating counterweight member is coupled to the hub portion and received in the recess formed in the body portion of the output gear.

9. The reciprocating power tool of claim 8, wherein the first rotating counterweight member and the second rotating counterweight member are configured to rotate together with the output gear, and to balance forces generated by reciprocating motion of the shaft along the axis of operation when the first rotating counterweight member and the second rotating counterweight member are positioned in phase with reciprocating motion of the shaft along the axis of operation; and the counterbalance device is configured to balance forces generated by the first rotating counterweight member and the second rotating counterweight member when the first rotating counterweight member and the second rotating counterweight member are positioned out of phase with reciprocating motion of the shaft along the axis of operation.

\* \* \* \* \*